United States Patent [19]
Shah et al.

[11] Patent Number: 5,245,195
[45] Date of Patent: Sep. 14, 1993

[54] RADIATION RESISTANT FILM

[75] Inventors: Tilak M. Shah; Joseph D. McGarry, both of Cary, N.C.

[73] Assignee: Polygenex International, Inc., Cary, N.C.

[21] Appl. No.: 802,551

[22] Filed: Dec. 5, 1991

[51] Int. Cl.$^5$ ............................................. G21F 3/02
[52] U.S. Cl. ............................... 250/515.1; 250/519.1
[58] Field of Search ................ 250/515.1, 516.1, 519.1

[56] References Cited

U.S. PATENT DOCUMENTS

| | | | |
|---|---|---|---|
| 3,756,241 | 9/1973 | Patience | 604/362 |
| 4,670,658 | 6/1987 | Meyers | 250/519.1 |
| 4,828,106 | 5/1989 | Akao et al. | 428/35.7 |
| 4,891,391 | 1/1990 | McEntee | 428/907 |
| 4,963,594 | 10/1990 | Gay | 524/305 |

*Primary Examiner*—Bruce C. Anderson
*Attorney, Agent, or Firm*—Waldron & Associates

[57] ABSTRACT

X-ray attenuation, particularly for protective garments is provided by a film of a thermoplastic elastomer containing from about 60 to about 90 weight percent of barium sulfate or other barium salt. Films having a thickness of about 1 mm provide attenuation equivalent to that of about 0.2 to 0.25 mm of lead foil. The film is pliant, durable, and resistant to cracking from normal flexure during use and wear.

6 Claims, 1 Drawing Sheet

RADIATION RESISTANT FILM

BACKGROUND OF THE INVENTION

1. Field of the Invention

The present invention relates to the technical field of X-ray shielding, and particularly to the protection of humans, such as X-ray technicians and equipment operators, from the effects of exposure to radiation damage.

2. Background of the Invention

Medical workers and others who work with X-rays and X-ray equipment require protection from the radiation. Long term exposure, even to very low levels of X-rays, is known to produce a substantial number of serious effects.

Such workers are normally furnished with protective garments, including coats, aprons, gloves, thyroid shields, gonad shields, and the like.

Protective garments or coverings are increasingly being employed to protect medical patients from excessive and stray X-ray exposure. Protective garments may be in the same form as those employed by technicians. Other protective coverings may include sheets, drapes, Such protective garments are made most commonly from rubber sheets filled with lead, lead oxide, or other lead salts, or from laminates of lead foil faced with polymer films. Natural rubber is frequently employed, but other synthetic rubber may also be employed, such as styrene-butadiene (SBR), polyisoprene, polybutadiene, and the like, as well as polyolefins, such as polyethylene, or polyesters, such as polyethylene terephthalate are employed as well.

So that the relative protective value of shielding materials can be assessed and compared, it is common to relate the attenuation of incident X-rays to the attenuation of elemental lead foil. Standard levels of protection for X-ray shielding are 0.5 mm of lead and 0.25 mm of lead, and equivalents to these attenuation valves or better must be attained in other forms of materials. Thus, attenuation is normally expressed as mm of lead equivalence.

The forms of shielding materials heretofore employed are quite heavy, resulting in cumbersome, hot, uncomfortable, and inconvenient garments and the like which often hinder the wearer. In addition, the materials are not durable because of the very high loadings of the filler materials into the rubber sheet or the eventual breakdown of lead foils, after repeated flexing. In addition, the materials are relatively difficult to fabricate into useful garment forms.

Barium salts, and particularly barium sulfate, are extensively used as a contrast medium for diagnostic X-rays and have long been known to be opaque to such radiation. Such salts have been incorporated into surgical materials such as sponges, sutures, and the like for post-operative detection. See, for example, U.S. Pat. No. 4,185,626. Barium sulfate is also employed as a base material for X-ray fluorescent recording film.

Barium salts, and barium sulfate in particular, have not been employed in X-ray shielding films because the volume required to achieve acceptable levels of shielding require either unacceptably thick and expensive sheets or loadings in rubber films at proportions which unacceptably compromise the mechanical properties, and particularly the flexural modulus and resistance to flexing.

While barium and barium salts have often been incorporated into polymer systems for a wide variety of purposes, the levels acceptable rarely exceed about 40 weight percent, although occasional applications at levels up to about 50 percent are known. Higher loadings are required to afford useful X-ray shielding in sheet materials of workable thicknesses.

SUMMARY OF THE INVENTION

It is an object of the present invention to provide X-ray protective films and X-ray protective garments and the like comprising thermoplastic elastomers and a barium salt in an amount sufficient to provide effective X-ray shielding, where the film is pliable, durable, relatively light in weight, and suitable for fabrication into coats, jackets, aprons, gowns, gloves, thyroid shields, gonad shields, patient protective wear and drapes, film bags, carriers, shipping containers, and the like.

The protective sheet or film will ordinarily comprise an elastomer of a synthetic thermoplastic polymer or blend of polymers filled with finely divided particulate barium sulfate. The barium sulfate will be present at levels of from about 60 to about 90 weight percent. Preferably the barium sulfate is treated with a coupling agent, such as an organo silane or organic titanium salts and the like.

DETAILED DESCRIPTION

Figure 1:
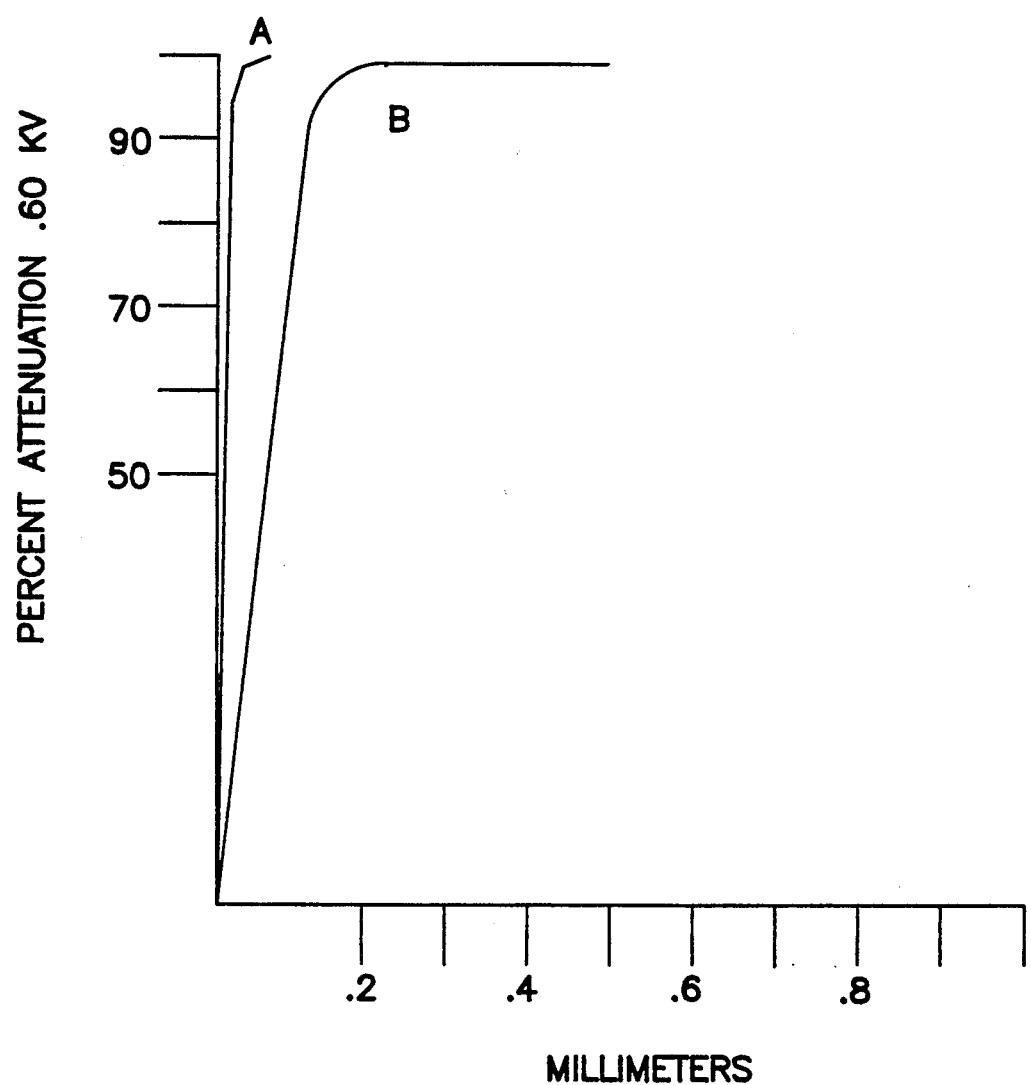
FIG. 1 is a graph illustrating the x-ray attenuation of two materials, A, a lead foil, and B, an embodiment of the present invention, as a function of their thicknesses.

In the present invention a filled polymer film is formed comprising two essential ingredients, a thermoplastic elastomer and a barium salt, preferably barium sulfate. Other ingredients are often desirable inclusions, such as plasticizers, coupling agents, UV stabilizers, antioxidants, antimicrobials and biocides, lubricants, fillers, dyes, pigments, antistatic agents, flame retardants, and the like.

The film is formed by conventional elastomer compounding and film forming techniques and forms no part of the present invention. Those of ordinary skill in the art are familiar with a variety of techniques and may freely select on the basis of convenience, economy, and availability of equipment. In the present application, compounding and film forming are conducted on a heated roll blender.

The relative proportions by weight of the thermoplastic elastomer and the barium sulfate should be in most circumstances in the range of about 1 to 3 up to about 1 to 9. Thus, barium sulfate will be from about 60 to about 90 weight percent of the film. As a general rule, the proportion of the barium sulfate should be the highest level possible without unduly compromising the physical properties of the film.

The film will generally be formed with a thickness of from about 0.5 to about 3.0 millimeters, preferably about 0.75 to about 1.25 mm. If greater attenuation is required, the film may be employed in multiple plies or a thicker film may be employed.

As a general approximation, at 85 weight percent barium sulfate, a 1 mm thick film will be equivalent to 0.2 mm Pb foil. As a rule, attenuation is a direct function of the film thickness as illustrated in FIG. 1, for a given proportion of barium sulfate by weight. A represents the lead foil, and B represents the film of the present invention. The thickness of the material is shown along the x axis and its percent attenuation at 60 KV is shown along the y axis.

At the same time, the specific gravity of the film at such proportions will ordinarily be less than 3 g/cm$^3$ generally about 2.8 to 2.9, while that of lead is 11.34 g/cm$^3$, and that of lead oxide (litharge) is 9.3 g/cm$^3$. When dispersed in a polymer film, powdered lead and litharge require about 1.5 times the weight of the film of the present invention to achieve the same lead foil equivalence.

Even at the high weight loadings of the present invention, the X-ray attenuation film have excellent physical properties for use in shielding garments. Tensile strengths are generally greater than 35,000 g/cm$^2$. Elongation at break is greater than 50%, and normally greater than 60%. Hardness of about 75 to 90 on the Shore A scale is typical. Flexural modulus and resistance to flex fatigue are excellent.

It is helpful that barium sulfate is non-toxic. This is of particular importance when the protective shielding is cleaned and/or sterilized, as well as during normal use, particularly long term use where exposure to low levels of lead is a particular hazard.

Barium sulfate is greatly preferred, but barium carbonate, oxide, acetate, and the like may also be employed. It is preferred that only non-toxic salts be used. When other salts are employed, it is preferred that they be combined with a major proportion of barium sulfate.

Coupling Agents

The durability of the X-ray attenuating sheets and films of the present invention at the high proportions of the barium sulfate to the elastomer is dependent on attaining good bonding of the elastomer to the surface of the solids dispersed therein. Bonding is, in turn, influenced by several factors.

The barium sulfate should be finely divided to maximize the surface area. As a general rule, the smaller the particle size, the better the bond. Particle sizes of less than 50 microns are preferred.

The barium sulfate should also be as dry as possible. If the material is free of hydration, the surface will be more active and better bonding of the elastomer will result.

Still better bonds are formed by employing coupling agents. Those of ordinary skill in the art will be generally familiar with coupling agents, such as those commonly employed with, for example, silica and siliceous reinforcing filters. As a rule, any of the coupling agents employed with silica will also be effective in the present invention. Typical of such coupling agents are silanes, titanates, chromates, aluminates, and the like. Silan S-103A ® (Union Carbide) and TTOP-12 ® (Kenrich Petrochemical, Inc.) are two commercially available examples. The first is an alkyl silane, while the second is an organic titanate. As is usual in the use of such materials, the proportions are widely variable, generally in relation to the available surface area of the filler, as those of ordinary skill in the art will readily understand.

Thermoplastic elastomers are synthetic polymers which exhibit elastomeric properties of elasticity, elongation, recovery, and related properties below a transition temperature, and which also exhibit plastic flow characteristics above the transition temperature. A wide variety of such polymers and blends of polymers are known, including olefin co-polymers, such as ethylene-propylene co-polymers and terpolymers with other co-monomers, styrene-butadiene block and graft co-polymers such as Krayton ®, available from Shell Oil Co., polyester based and polyether based thermoplastic polyurethanes, co-polymers of acrylonitrile with olefin co-monomers, and the like.

The thermoplastic elastomers may be employed as such, in blends with one another, and in blends with minor amounts of other non-elastomeric thermoplastics such as polyvinyl chloride, polyvinylidene chloride, polyolefins, such as polyethylene or polypropylene, polystyrene, polyamides, such as Nylon 6, Nylon 6T, Nylon 12, and the like, acrylic polymers and co-polymers, and polyesters, such as polyethylene terephthalate. In addition, blends may be formed with cross-linkable (curable) elastomers, such as styrene-butadiene rubber (SBR), styrene-isoprene rubber (SIR), polybutadiene, polyisoprene, butyl rubber, and the like. When curable elastomers are employed, they may be left uncured or a curing system may be employed which is not reactive with thermoplastic elastomer. When blends are formed of such polymers, at least 50% of the polymer should be thermoplastic elastomer.

The thermoplastic elastomer, whether a single polymer or a blend, should whenever possible have a transition temperature from elastomer to plastic which is higher than usual autoclaving temperatures of 140° C. to 160° C. It is preferred that the transition temperature be at least 175° C. This permits the film, X-ray protective garments, and the like to be sterilized by autoclave. If that is not possible, cold sterilizing will be required.

Other ingredients will ordinarily be included with the barium sulfate and the polymer in making the film. As a general rule, such materials will be chosen based on their suitability for the selected polymer in accordance with the usual practice in the art, in light of the desired properties as defined herein. Such compounding ingredients are familiar to those of ordinary skill in the art and do not form a part of the present invention.

By illustration, the following components will often be employed in compounding of the polymer system of the present invention:

Although barium sulfate alone is extremely effective in providing X-ray resistant characteristics when blended into thermoplastic and/or rubber articles, it is also possible to use other X-ray attenuating metals and metallic salts or blends of metallic salts such as, but not limited to: bismuth salt, tungsten salt, tin powder, and aluminum powder. Examples of acceptable blends are: barium sulfate and bismuth salt; barium sulfate, bismuth salt, and tungsten; barium sulfate and tin powder; and barium sulfate and aluminum powder. In such blends, barium sulfate should be at least 50% of the X-ray attenuating component.

Plasticizer

When necessary, plasticizers can be added to the composition in an amount sufficient to reduce brittleness, increase wear, and improve flexibility. Plasticizers are well known in the art and can be selected from, but not limited to: phthalic acid ester, glycol ester, fatty acid ester, and phosphoric acid ester. Examples of commercially available plasticizers are epoxidised soybean oil (ESO), dioctyl phthalate (DOP), diisooctyl phthalate (DIP) and BENZOFLEX TM (diethylene glycol dibenzoate), which can be obtained from Velsicol Co. The preferred amount to be used in the composition is up to 100 parts by weight per 100 parts of thermoplastic elastomer. The plasticizers can be used alone or in combination depending on the polymer or polymers to be used and the desired characteristics of the article to be manufactured.

Antimicrobial Agents

Antimicrobial agents and biocides can be incorporated into thermoplastic articles during the fabrication of the thermoplastic articles resulting in microbial resistant products. See, for examples, McEntee, U.S. Pat. No. 4,891,391. This is a particularly important consideration when manufacturing articles that will be used in a medical setting. Antimicrobial agents suitable for incorporation into thermoplastic materials include, but are not limited to: phenoxarsines, phenarsazines, maleimides, isoindole dicarboximides, halogenated aryl alkanols, isothiazolinone compounds, organotin compounds, and the like. Examples of commercially available fungicides that can be used include VINIZYNE TM and IT 3000 DIDP TM, both of which can be obtained from Morton Thiokol. The preferred range is from about 0.25 to 5 weight percent of the film, but should be used in an amount appropriate and sufficient to inhibit the growth of bacteria and/or fungus in light of the use for which the article is intended.

UV Stabilizers

Thermoplastics, after an extended period of exposure, tend to acquire a yellowish tinge that reduces the attractiveness of the finished product and may reduce its utility. Among the ways to improve the weatherability and sunlight resistance of thermoplastics include coating the surface with an organic resin containing a UV stabilizer. The stabilizer may also be incorporated directly into the thermoplastic. See, for example, U.S. Pat. Nos. 4,344,830 to Olson; 4,749,726 to Gupta, et al.; and 4,963,594 to Gay, hereinafter incorporated by reference. If appropriate, UV stabilizers can be incorporated into the composition of the present invention in an amount sufficient to prevent polymer degradation and yellowing. Examples of acceptable UV stabilizers are, but not limited to: benzophenones, benzotriazoles, benzenesulfonates, and phenyl salicylates. An example of a commercially available UV stabilizer is TINUVIN TM P, a benzotriazole available from Ciba-Geigy. The preferred amount to be used is typically in the range of 0.1 to 5 percent by weight of the film.

Antioxidants

Antioxidants are frequently added to thermoplastics compositions to prevent polymer degradation. Antioxidants are particularly useful when adding high concentrations of barium salt to polymers. There is a wide spectrum of needs for antioxidants in different polymers and plastic compounds. For example, some resin compositions cannot be fabricated at all without antioxidants, while polyvinyl chloride compositions and polyamides (such as nylon) compositions do not benefit substantially from inclusion of an antioxidant except during high temperature fabrication. The use and selection of antioxidants is well known in the art. *The Index of Commercial Antioxidants and Antiozonants*, 3rd Edition (1982), distributed by the Goodyear Chemical Division of Goodyear Tire and Rubber Co., Akron, Ohio, and McEntee, U.S. Pat. No. 4,891,391 recite an extensive list of available antioxidants and are herein incorporated by reference. Examples of suitable antioxidants are BHT (butylated hydroxytoluene), a monophenol supplied by Koppers, and Irganox TM 1010, a polyphenol supplied by Ciba-Geigy. The preferred range is 0.1 to 5 percent by weight of the thermoplastic elastomer.

Lubricant

Lubricants can also be added to the composition. Examples of lubricants which can be used are, but not limited to: higher fatty acid lubricants, silicone lubricants, metallic soaps, aliphatic hydrocarbon lubricants, and fatty acid amide lubricants. Examples of commercially available lubricants are Glycolub VL, a glyceride of a fatty acid, most often stearic acid. The preferred amount is in the range of 0.1 to 5 percent weight, most preferably 0.2 to 1 percent by weight.

Pigment

Various coloring agents can be added to the film such as inorganic and organic pigments. Examples of suitable inorganic pigments include carbon black, tin oxide, zinc oxide, iron oxide, and cadmium sulfate. Examples of suitable organic pigments include organic dyes, and in particular, blue, red, and green pigment.

Carbon black is known to have light-shielding characteristics and has been used in packaging cases for photosensitive films. See for example, Akao, et al., U.S. Pat. No. 4,828,106. Carbon blacks include for example, gas black, oil furnace black, anthracene black, acetylene black, lamp black, vegetable black, and animal black. Carbon black has the further characteristic of increasing the physical strength of resins. Various blending methods of carbon black are known within the art, with the use of masterbatch methods being preferable in terms of cost and efficiency. The preferred parts by weight range of carbon black in the film is 1 to 5, most preferably 2.

Inorganic and organic pigments such as tin oxide ($TiO_2$), zinc oxide (ZnO), iron oxide ($Fe_2O_3$), cadmium sulfate (CdS), and organic dyes may be added to the film when the physical appearance may be considered of commercial importance. For example, when the film is to be used for patient or personnel protective wear such as in aprons, gowns, thyroid and gonad shields, airport X-ray protective bags, and film carriers. For example, the pigments may be selected from, but not limited to: blue, red and/or green pigment. Although some pigments also have light-shielding characteristics and this feature can help improve the effectiveness of the film, they are primarily chosen for aesthetic reasons.

Other additives that may be added if appropriate include: antistatic agents, flame retardants, filler, and reinforcing agents.

Once the composition for the film has been selected, the components are combined and formed into a film of appropriate thickness and, in turn, into X-ray protective products. The products include, but are not limited to: aprons, gowns, thyroid shields, gonad shields, patient protective wear, personnel protective wear, airport X-ray protective bags, and film carriers.

As noted above, the compounding and film forming are accomplished by conventional procedures. In the present invention, the work has been done on a three-roll heated mill. Compounding and film formation are usually conducted at temperatures above the plastic transition temperature of the polymer. In general it is preferred to thoroughly mix the polymer and the barium sulfate, and optionally any plasticizer, to a substantially homogeneous dispersion of the solid into the plastic mass prior to the introduction of other ingredients.

If a coupling agent is employed, it should be milled with the barium sulfate prior to forming the polymer-barium sulfate blend. The barium sulfate should be as finely divided as possible.

It is self-evident that the properties desired require that the polymer in the film be an elastomer. It is not self-evident that it should be thermoplastic. While applicant has no wish to be bound, it is believed that there are two aspects of thermoplastic elastomers which account for the effectiveness of the present invention.

First, milling the barium sulfate into the polymer in a plastic state permits the formation of high levels of wetting and bonding to the surface of the solid. When the compounded blend is then formed into sheets and cooled, these bonds remain intact. In curable elastomers, the curing agents, cross-linking agents, vulcanizing agents, accelerators, initiators, chain extenders and chain terminators, and the like tend to compete for the bonding sites and limit, disrupt, and even eliminate the bond between the polymer and the solid surface. As a result, there is a far better bond between the solid and the polymer in the system in the present invention.

Second, when cured or cross-linked film deform, the bonds between polymer and solid may be disrupted and, upon relaxation, do not reform. In the thermoplastic elastomers, the nature of elastic deformation and recovery are less likely to cause disruption of the bonds and facilitate their reformation when disruption does occur.

Once bonding between the polymer and solid are lost, the polymer is far more susceptible to the initiation and propagation of tears and cracks. In extreme cases, the film may become friable. More commonly, its durability in use is compromised.

As a result of these considerations or others, the effective bonding of the polymer to the solid barium sulfate is far grater.

It is the thermoplastic elastomer which permits the employment of the high loading of the barium sulfate, which in turn achieves the high levels of X-ray attenuation in relatively thin and pliable films with a long useful life.

In one variation on the present invention, particularly of interest because of cost confederations, is the use of nitrile rubber; i.e., a random co-polymer of acrylonitrile and butadiene in a thermoplastic elastomer blend with polyvinyl chloride and/or other thermoplastic polymers. Such blends may be based on a minor amount, from about 10 to about 50 weight percent of the nitrile rubber in the polymer blend, with about 50 to about 90 weight percent PVC. Such thermoplastic elastomer blends will require substantial levels of plasticizers, typically about 50 to about 100 parts by weight of plasticizer, such as dioctyl phthalate (DOP), per hundred parts of elastomer blend.

To illustrate the present invention, the following examples will serve to guide those of ordinary skill in the art.

EXAMPLE 1

A blend was formed of the components designated in Table I; proportions are specified as parts by weight per 100 parts of thermoplastic elastomer.

TABLE I

| | |
|---|---|
| TPU | 90 |
| Nitrite rubber | 10 |

TABLE I-continued

| | |
|---|---|
| ESO | 1 |
| DOP | 10 |
| DLTDP | 0.1 |
| Glycolub VL | 0.2 |
| BHT | 1 |
| TINUVINP | 1 |
| Vinizyne | 1 |
| BaSO$_4$ | 670 |
| Carbon black | 2 |
| TiO$_2$ | 2 |

TPU is a thermoplastic polyurethane elastomer, Pellethane ® available from Dow Chemicals, Inc., polymerized from a polyether diol and a diisocyanate.

Nitrite rubber is a random co-polymer of about 60 weight percent acrylonitrile and about 40 weight percent isobutylene.

ESO is an epoxidized soybean oil plasticizer.

DOP is dioctyl phthalate, a common plasticizer.

DLTDP is di-lauryl thio-di-propionate, also a plasticizer.

Gylcolub VL is a fatty acid glyceride, employed as a lubricant.

BHT is the common designation for butylated hydroxytoluene, or specifically 4-methyl-2, 6-tert-butyl phenol, a frequently employed antioxidant.

TINUVINP is a benzotriazole, an ultraviolet and visible light stabilizer, available from Ciba-Geigy.

Vinizyne is a proprietary fungicide available from Morton Thiokol.

The blend was rolled into a film of 1 mm thickness and evaluated for X-ray attenuation in comparison with 4 different thicknesses of lead foil. These data are shown in TABLE III, below.

The film had a specific gravity of 2.9 grams per cubic centimeter, a tensile strength of 42,500 grams per square centimeter, an elongation at break of 60%, and a hardness of 75 on the Shore A scale.

EXAMPLE 2

Another blend was formed and tested having the following formulation:

TABLE II

| | |
|---|---|
| Nitrile | 30 |
| PVC | 70 |
| ESO | 5 |
| DOP | 30 |
| CZ 45 M | 3 |
| Stearic acid | 1 |
| BHT | 1 |
| TINUVINP | 1 |
| IT 3000 DIDP | 4 |
| TTOP-12 | 3 |
| BASO$_4$ | 860 |
| Carbon black | 2 |
| ZnO | 2 |

The formation was rolled into a film having a thickness of 0.75 mm and evaluated for X-ray attenuation. The data are shown in Table III, below.

The film was found to have a specific gravity of 2.93 g/cm$^3$, a tensile strength of 40,000 g/cm$^2$, elongation at break of 70%, and a hardness of 69 Shore A.

X-ray attenuation of 4 lead foils; one, two, and three plies of the film of Example 1; and one, two, three, and four plies of the film of Example 2 were determined at four different X-ray power levels. The results are shown in Table III:

TABLE III

| | Percent Attenuation and Lead Equivalence in mm | | | | | | | |
|---|---|---|---|---|---|---|---|---|
| | 60 KVP | | 80 KVP | | 100 KVP | | 125 KVP | |
| | % | Pb | % | Pb | % | Pb | % | Pb |
| Lead Foil: | | | | | | | | |
| 0.152 | 93.0 | | 86.0 | | 80.0 | | 78.0 | |
| 0.305 | 98.0 | | 95.0 | | 91.0 | | 89.0 | |
| 0.457 | 99.0 | | 98.0 | | 95.0 | | 94.0 | |
| 0.610 | 99.9 | | 99.0 | | 97.0 | | 96.0 | |
| Example 1: | | | | | | | | |
| 1 ply | 90.2 | > .15 | 88.2 | .2 | 85.3 | .25 | 80.7 | .2 |
| 2 plies | 99.7 | > .45 | 97.2 | .4 | 95.5 | .45 | 91.9 | .39 |
| 3 plies | 99.9 | > .61 | 99.0 | .6 | 97.0 | .69 | 96.0 | .55 |
| Example 2: | | | | | | | | |
| 1 ply | 80.7 | < .15 | 77.7 | < .15 | 72.9 | < .15 | 67.2 | < .15 |
| 2 plies | 94.4 | > .15 | 93.3 | .25 | 90.2 | .28 | 86.0 | .27 |
| 3 plies | 98.3 | > .3 | 97.5 | .42 | 95.5 | .45 | 97.4 | .40 |
| 4 plies | 99.9 | > .6 | 99.1 | .61 | 97.8 | .62 | 95.4 | .52 |

What is claimed is:

1. A pliant X-ray attenuating protective film comprising a sheet of a thermoplastic elastomer and about 60 to 90 weight percent of a barium salt substantially homogeneously dispersed therein.

2. The film of claim 1 wherein said barium salt is barium sulfate.

3. The film of claim 2 wherein the thickness of the film is from about 0.5 to about 5 millimeters.

4. The film of claim 2 wherein the thickness of the film is from about 0.75 to about 1.25 millimeters.

5. The film of claim 4 wherein the X-ray attenuation of the film is equivalent to that of a lead foil of 0.2 millimeters in thickness.

6. An X-ray attenuating protective garment having at least one thickness of the protective film of claim 1 placed on at least selective portions thereof.

* * * * *